H. KÜNTZLER.
ITEM INDICATOR.
APPLICATION FILED NOV. 11, 1912.

1,206,863.

Patented Dec. 5, 1916.
6 SHEETS—SHEET 1.

WITNESSES:
A. W. Gardes.
W. H. Kreitz

INVENTOR
Henry Küntzler
BY
Robert Magrane
ATTORNEY

H. KÜNTZLER.
ITEM INDICATOR.
APPLICATION FILED NOV. 11, 1912.

1,206,863.

Patented Dec. 5, 1916.
6 SHEETS—SHEET 2.

WITNESSES:

INVENTOR
Henry Küntzler
BY
Robert Magrane
ATTORNEY

H. KÜNTZLER.
ITEM INDICATOR.
APPLICATION FILED NOV. 11, 1912.

1,206,863.

Patented Dec. 5, 1916.
6 SHEETS—SHEET 3.

H. KÜNTZLER.
ITEM INDICATOR.
APPLICATION FILED NOV. 11, 1912.

1,206,863.

Patented Dec. 5, 1916.
6 SHEETS—SHEET 4.

WITNESSES:

INVENTOR
Henry Küntzler
BY
Robert Mayrane
ATTORNEY

H. KÜNTZLER.
ITEM INDICATOR.
APPLICATION FILED NOV. 11, 1912.

1,206,863.

Patented Dec. 5, 1916.
6 SHEETS—SHEET 5.

WITNESSES:
A. W. Gardes.
W. H. Kreitz

INVENTOR
Henry Küntzler
BY
Robert Magrane
ATTORNEY

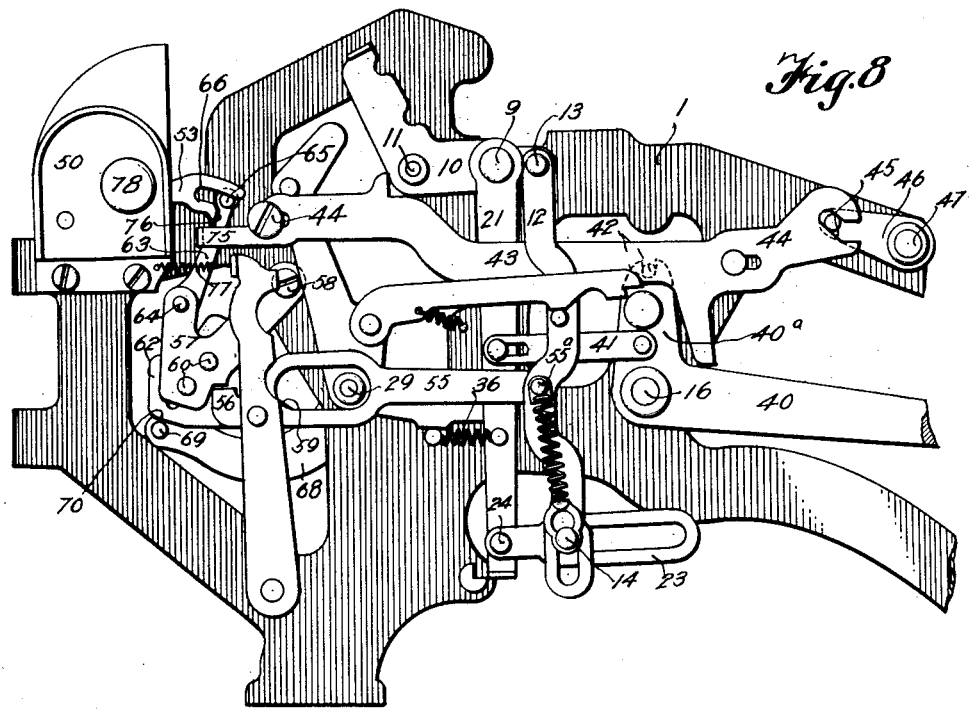
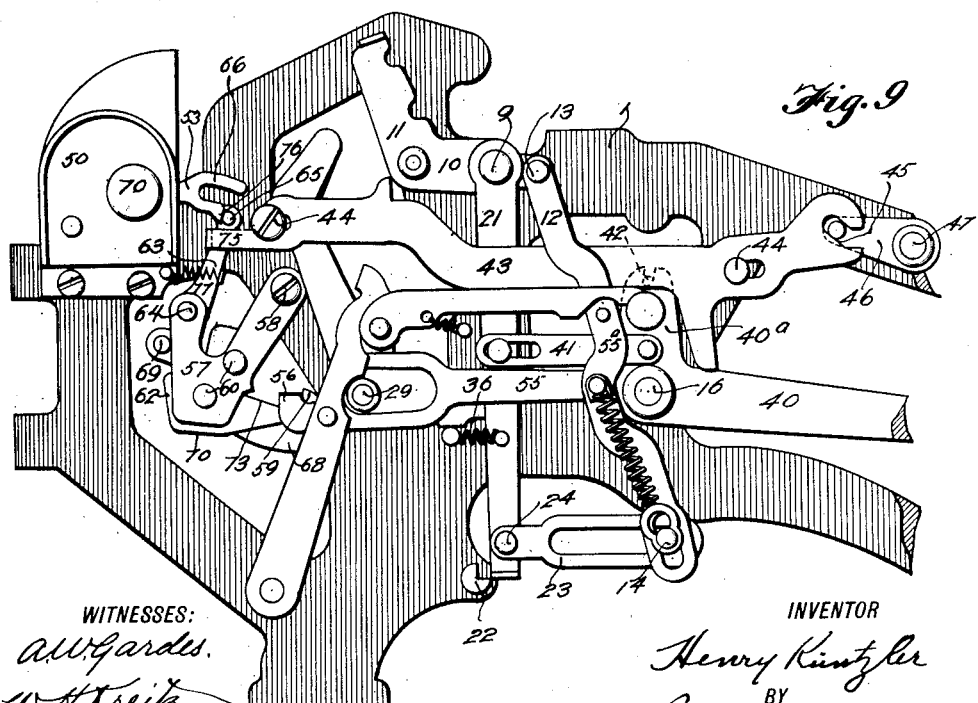

UNITED STATES PATENT OFFICE.

HENRY KÜNTZLER, OF LUZERNE, PENNSYLVANIA, ASSIGNOR TO THE ADDER MACHINE COMPANY, OF WILKES-BARRE, PENNSYLVANIA, A CORPORATION OF PENNSYLVANIA.

ITEM-INDICATOR.

1,206,863.

Specification of Letters Patent.

Patented Dec. 5, 1916.

Application filed November 11, 1912. Serial No. 730,630.

*To all whom it may concern:*

Be it known that I, HENRY KÜNTZLER, a citizen of the United States, residing at 407 Main street, Luzerne, Luzerne county, Pennsylvania, have invented new and useful Improvements in Item-Indicators, of which the following is a specification.

This invention relates to item-indicators and is more particularly designed for use on calculating machines. It may readily be applied to other machines, however, to count operations, articles or what not.

One object is to provide an improved and simplified item indicator which is readily attachable to a variety of calculating machines now on the market without material change, instead of being confined to a special type.

The invention comprises an indicator driven from the main drive shaft, the connection between the main drive shaft and the indicator being normally disabled, so that the indicator will not register on an idle stroke of the machine, together with an adjusting means controlled by some part common to machines of various types, and shiftable only during an effective stroke, to render said connection operative. Furthermore, means controlled by mechanism operated when a total is to be taken whether the register is cleared or not, disables said connection during such totaling or clearing stroke, to prevent a registering operation of the item-indicator.

Other objects and advantages will be more fully set forth hereinafter, and particularly pointed out in the claims.

Figure 1:
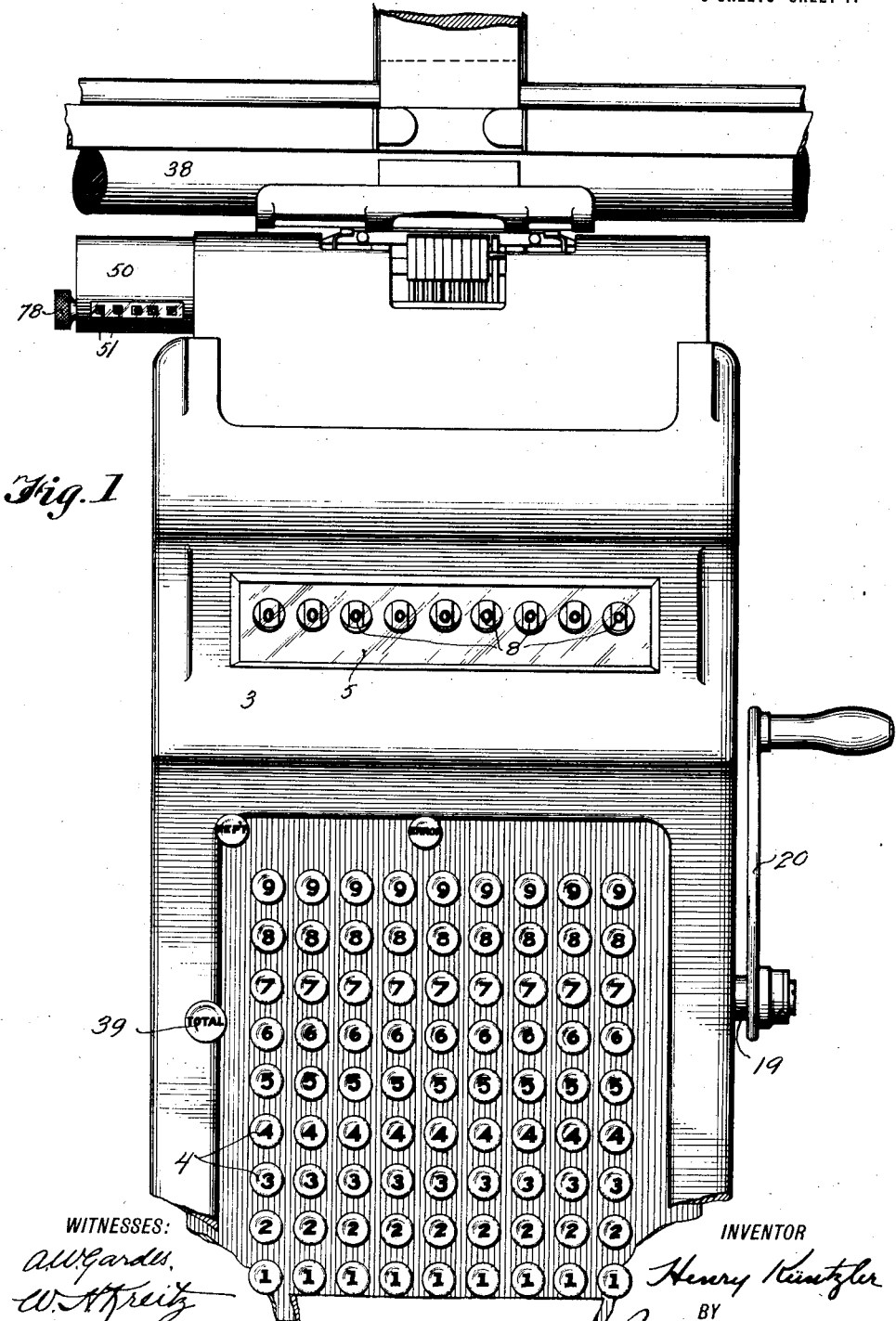
Figure 2:
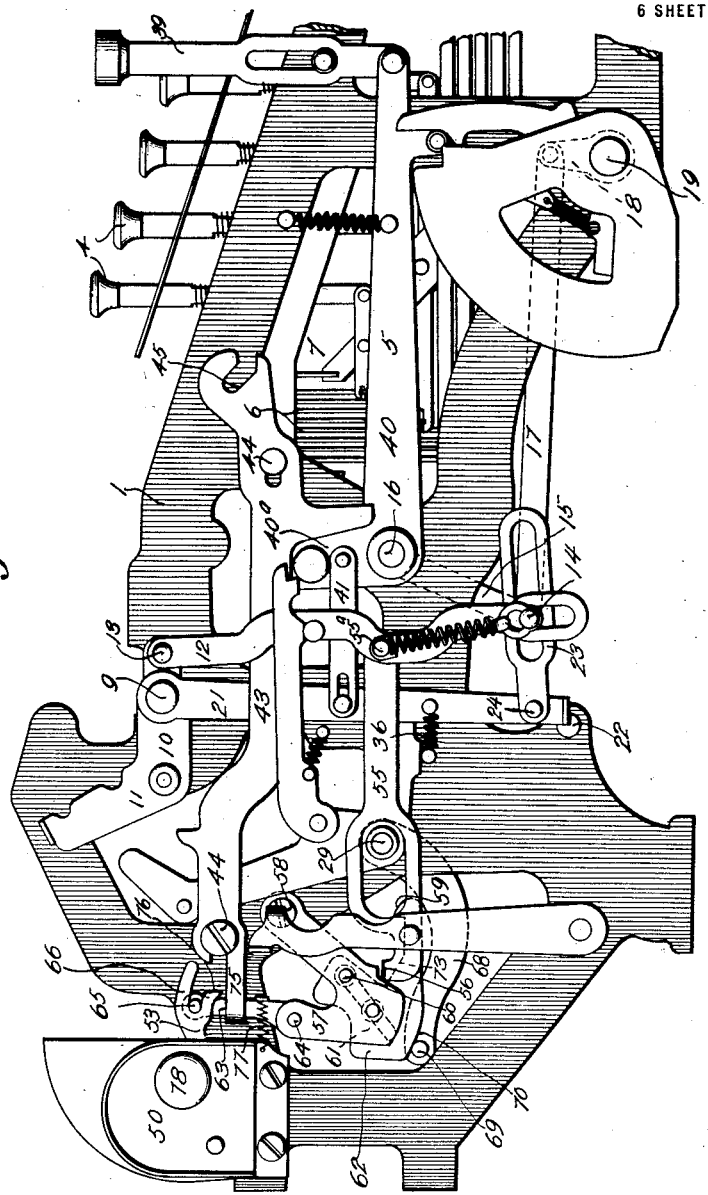
Figure 3:
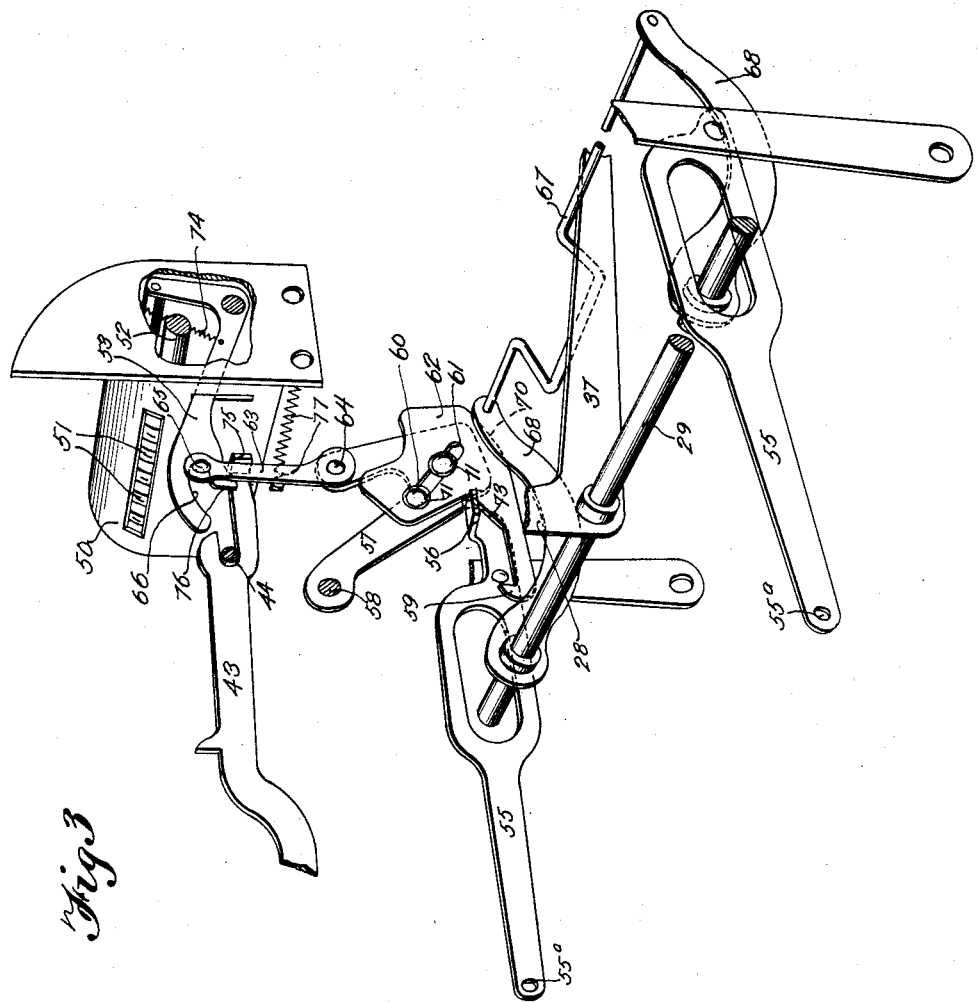
Figure 4:
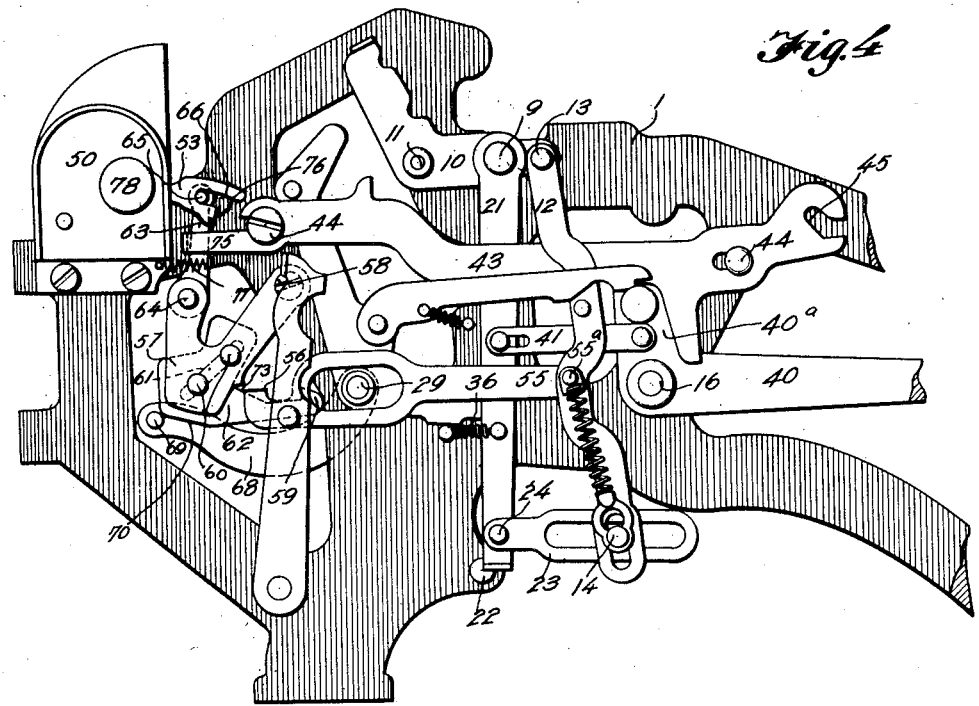
Figure 5:
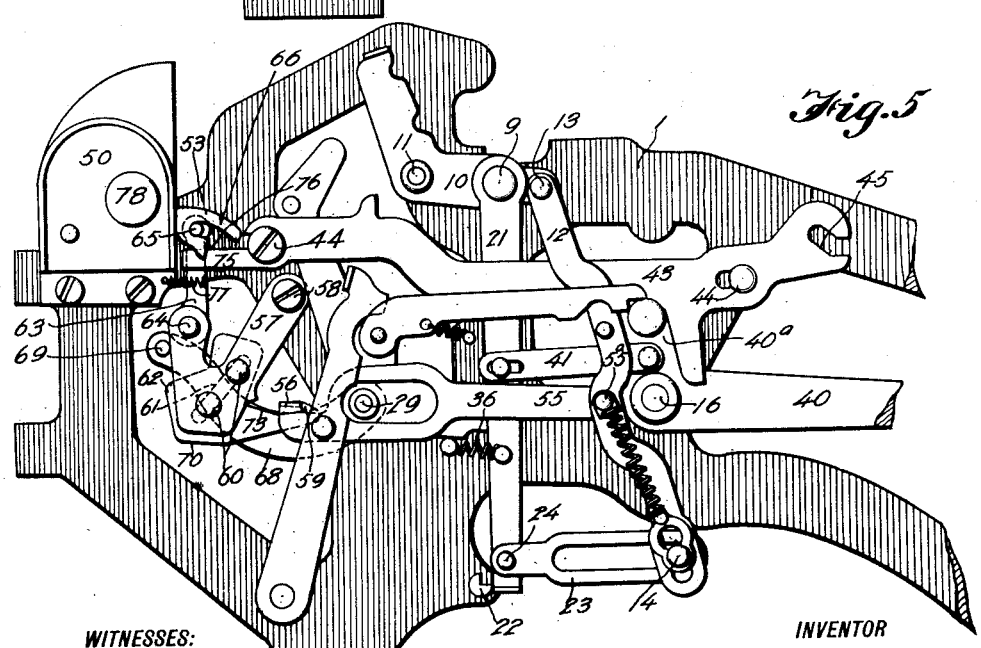
Figure 6:
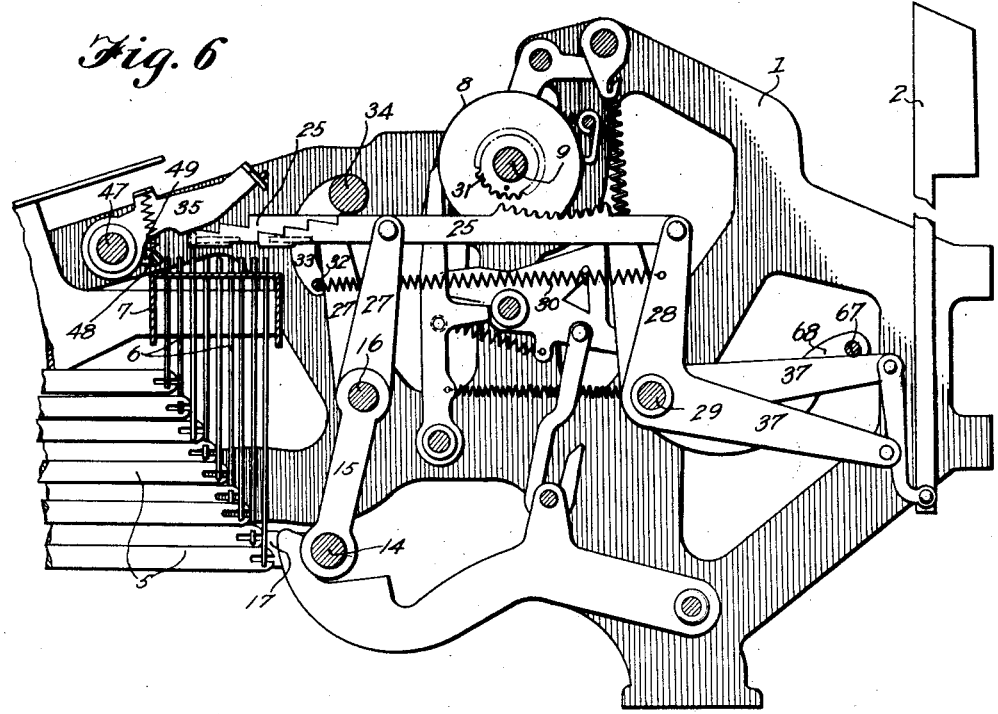
Figure 7:
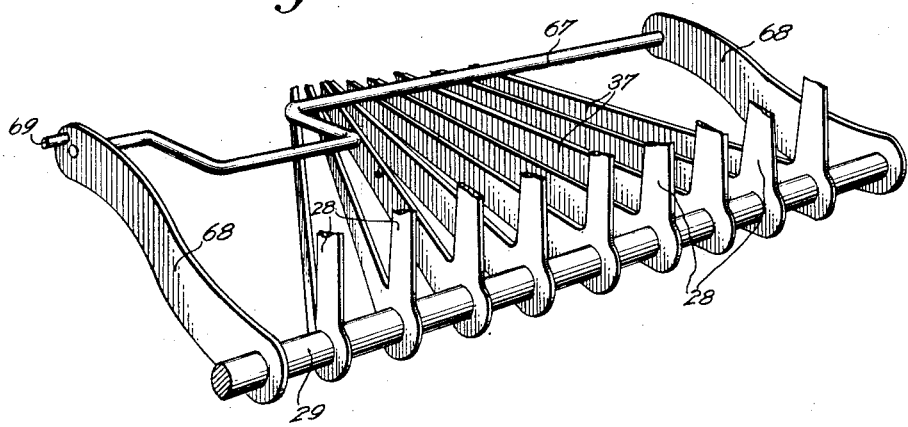

In the accompanying drawings, Figure 1 is a plan view of one embodiment of this invention applied to the well-known Wales adding and listing machine. Fig. 2 is a view of the left side of the machine at rest, to illustrate the connection between the indicator proper and the usual mechanism employed in a Wales machine. Fig. 3 is a detail perspective of the indicator-operating mechanism. Fig. 4 is a side view, showing the position assumed by the indicator-operating mechanism during the forward stroke of the main drive shaft, but prior to the engagement of the counters with their drive members. Fig. 5 is a similar view, showing the positions of the parts at the end of said forward stroke, the indicator having been operated. Fig. 6 is a longitudinal sectional view, showing one means to operate the adjusting mechanism. Fig. 7 is a detail perspective of a part of the gang of drive members, and the adjusting mechanism. Fig. 8 is a side view, showing the draft mechanism and indicator disengaged by depression of the total key. Fig. 9 is a similar view, taken when the main drive shaft is at the end of its forward stroke.

Reference is made to patents to McFarland, 842,232, Jan. 29, 1907; and to Wales 797,032, August 15, 1905, to illustrate and explain such parts of the Wales machines as are not herein fully disclosed.

The side frames 1, 1 (Fig. 2) support a keyboard mechanism, a registering mechanism, and a printing mechanism including type carriers 2, (Fig. 6). This mechanism is inclosed within a casing 3 (Fig. 1) cut away to afford access to the keys 4, and having a transparent plate 5ª through which the counters 8 of the registering mechanism are visible.

The keys 4 are preferably arranged in banks, as shown in Figs. 1, 2 and 6. Depression of the keys rocks levers 5 to project stops 6 above a housing 7, said stops being arranged in rows to correspond with the banks of keys controlling them.

Counters 8 are individually rotatable upon an axle 9 mounted at its opposite ends in arms 10 pivoted at 11 to the side frames. Props 12 (Fig. 4) pivoted at 13 to the arms 10 are slotted at their lower ends to rest on a trip rod 14 supported by links 15 (Fig. 2) from shaft 16 and connected by links 17 and cranks 18 with the main drive shaft 19. A handle 20 (Fig. 1) may be used to turn said drive shaft.

The main drive shaft 19 when turned on its forward stroke, operates the connecting links 17 to swing the trip rod 14 in a descending arc to lower the props 12 and with them the axle 9 and counters 10. Legs or supports 21 connected to the opposite ends of the axle 9, normally lie in line with seats 22 on the side frames 1, so that as the axle starts to descend, the legs rest on the seats (Fig. 4) to hold the counters idle until the main shaft has nearly reached the end of its forward stroke. Meanwhile the ends of the trip rod 14 travel idly, relatively to bridle links 23 connected at 24 to the legs 21, until toward the end of the forward stroke of the main drive shaft, the trip rod 14 strikes the ends of the links 23 (Fig. 5) to dislodge the legs from their seats, whereupon the counters descend to engage pinions 31 (fast with each counter) with drive members 25 (Fig. 6). These drive members 25 are preferably rack-bars, pivotally mounted on front and rear arms 27 and 28 journaled on shaft 16 and cross rod 29, respectively. Springs 30, preferably connected to the rear arms 28, drive the rack bars forwardly. A bail 32 carried by arms 33 fast on a rock shaft 34, normally contacts the forward rack-supporting arms 27 to restrain the rack members 25 against operation. On the forward stroke of the main drive shaft, in an adding operation, said rock shaft 34 is turned (by means not shown) to withdraw the bail 32 and free the drive members 25, which advance, owing to springs 30, until arrested by the stops 6 projected into their paths.

The stops when projected, displace detainers 35 (Fig. 6) which, when in normal position, arrest those drive members into whose paths no stops have been projected to prevent a rotation of the corresponding counters.

The main shaft on its return stroke, forces the bail 32 against the forward arms 27 which have rocked forwardly, to return the arms and restore the drive members 25 to normal position. The drive members, as they are retired, turn the counters 8 to register or accumulate amounts corresponding to the values of the keys depressed. The main shaft, on its return, also restores the trip rod 14, the preliminary throw of which rod is idle, to enable the drive members to turn the counters, after which the trip rod swings upwardly to disengage the counters from the drive members and enable springs 36 to return the legs 21 into line with their seats 22.

The rear arms 28 may each have rearward extensions 37 (Fig. 6) to position the types of type carriers 2 relatively to the printing line on a platen 38 (Fig. 1). When the drive springs 30 advance the drive members 25, the latter rock the arms 37 to bring the proper type to the printing line, said type carriers being retired by the return of the drive members.

Depressing the total key 39 (Figs. 1, 2, 8 and 9) rocks levers 40 on opposite sides of the machine, connected by the cross shaft 16. Links 41 connect arms 40ª of said levers with the supports or legs 21 to swing the latter out of line with the seats 22, when the levers 40 are rocked by depressing the total key. A loose connection 42 (Fig. 8) between one of the arms 40ª and a connecting bar 43 guided on pins 44, enables the key 39, when depressed, to thrust said bar forwardly. A cam 45 on said bar wipes a crank 46 on a shaft 47 to rock the latter and with it a displacing bail 48 (Fig. 6) connected thereto by arms 49, whereby to shift the detainers 35 to ineffective position. Turning the main drive shaft 19 when the total key 39 is depressed, swings the trip rod 14 downwardly to lower pinions 31 into mesh with the drive members 25 prior to the advance of the latter. The subsequent withdrawal of the bail 32 frees the drive members to the action of their drive springs 30, which springs advance the drive members until the latter are arrested by abutments (not shown) on the counters 8, said checks forming part of the zero-resetting mechanism V disclosed in patent to McFarland, 842,232, January 29, 1907. The drive members on their advance, reverse the direction of rotation of the counters from that in which they are turned in registering, and at the arrest of the drive members by said checks, the counters have been restored to zero position, and the types in the type carriers 2 positioned to print the total registered by the counters at the depression of the total key. The printing operation occurs, and, providing the total key is released at the end of the forward stroke, the counters are disengaged from the drive members which then retire idly, leaving the counters at zero.

In taking a sub-total, the total key is held down throughout nearly the entire operation, to prevent the disengagement of the counters and drive members on the return stroke. As a result, the drive members when being retired, turn the counters, as in the adding operation, to again register the total amount disclosed prior to depression of the total key.

The foregoing construction is old and only constitutes part of the present invention, in so far as it is combined with the new devices now to be set forth.

To indicate the number of items registered on the machine, an item indicator 50, of any suitable construction is preferably removably secured to the machine. Said indicator includes a gang of numeral wheels 51 mounted on a shaft 52, and driven in any convenient manner, as by an operating lever 53. The indicator mechanism *per se* is immaterial to the present invention, and any suitable form now on the market may be assumed to be employed, for present purposes.

The inner end of lever 53 (Fig. 3) is connected to the operating mechanism of the indicator, said lever projecting through a slot 54 in the casing of the indicator. It is highly advisable that the indicator be operated only when an item is registered or printed or both; that the indicator remain idle during the operation of taking a total and clearing the machine, or of taking a sub-total; and that the indicator remain at rest during any idle stroke of the machine, that is, one in which no item is set up on the keyboard, to be registered or printed. Therefore, I contrive by the employment of simplified and improved mechanism, to rock the lever 53 by draft mechanism operated from the drive shaft 19, but normally ineffective, and to automatically effect the adjustment of said draft mechanism, to effective position, by means which operates only when an item is to be registered or printed or both. Furthermore, I contrive to disable the draft mechanism when a total or sub-total is to be taken or the machine cleared, by the operation of the usual mechanism for effecting these operations, so that though the adjusting mechanism and the draft mechanism operate, the latter will not effect a registration on the indicator.

A draft bar 55 (Figs. 4 and 5) is connected at 55ª to the prop 12 which, as before explained, is rocked back and forth by the trip rod 14 connected by links 17 and cranks 18 to the main shaft 19 to be operated thereby at each stroke. Said draft bar is preferably supported for reciprocatory movement and carries a hook or coupling member 56 (shown best in Fig. 3). A transmission lever 57 pivoted at 58, carries a cooperating hook or coupling member 59 loosely mounted thereon to shift thereon in a direction transversely to the path of the hook 56. Said hook 59 normally lies out of the path of the hook 56 so that upon an idle stroke of the main drive shaft, no coupling is effected and the indicator remains at rest. Such loose connection may be effected by pins 60 (Figs. 4 and 5) on the lever 57, passing through a slot 61 in a plate 62 from which projects the shiftable coupling member 59. Preferably, a link 63 pivoted at 64 to an extension of the lever 57, connects the latter with the operating lever 53 by means of a wrist 65 entered in and normally occupying one arm 66 of an angular slot formed in the operating lever.

To render the draft mechanism effective, I contrive an adjusting mechanism (Figs. 3 and 7) comprising a universal bar 67 overlying the arms 37 of the drive mechanism and carried in arms 68 swung from the rod 29; and an adjuster or tappet 69.

In a calculator of the general type to which the Wales machine belongs, whether it registers only and includes no printing mechanism or, vice versa, prints but has no registering mechanism, means must be provided either to drive the counters of the register, or to position the type carriers of the printing mechanism, or both. In the present instance, the arms 37 constitute such means and will be operated whether the machine is arranged to add only, to print only, or to both add and print. Hence the invention is applicable to different styles of machines of the same general type and is not confined to a single style, as a machine having a locking keyboard, for example.

At every effective stroke of the main drive shaft, one or more of the arms 37 rock, upwardly, and they in turn rock the universal bar 67, one of the arms 68 of which carries the adjuster or tappet 69. The tappet carried upwardly by the arm 68 strikes the edge 70 of plate 62, lying beyond the transmission lever 57, to shift the hook 59 into the path of the coacting hook 56, which latter as it advances picks up the hook 59 and draws it forwardly to rock the transmission lever 57 and cause the link 63 to swing the operating lever 53 of the indicator 50 downwardly to register or accumulate "1" thereon. Friction washers 71 may be used to hold the shiftable coupling where adjusted by the tappet 69, in case the travel of the tappet carries it past the rear end of the plate 62, before the engagement of the coupling 56 with the coupling 59. The draft coupling 56 is permitted a preliminary idle travel before engaging coupling 59, which lies in advance thereof, to afford the adjusting mechanism time in which to shift the coupling 59 into its path.

On the return stroke of the main shaft 19, the drive members 25 are retired, and with them, the arms 37, which permits the adjusting mechanism to return to idle position.

During the return of the draft bars 55, the coupling 56 wipes over an incline 73 (Fig. 3) on the coupling 59, 62, to restore the latter to normal position, and also strikes the transmission lever 57 to restore the latter and, through the connecting link 63, return the operating lever 53. A spring 74 may assist the return of the operating lever.

In taking a sub-total, or in taking a total and clearing the machine, it is desirable that the indicator remain idle. Depression of the total key 39 advances the connecting bar 43 (Figs. 8 and 9) through lever 40, arm 40ª thereof and connection 42. A catch or shifter 75 on the connecting bar lies behind the link 63 and when the connecting bar advances, the catch shifts the link so that its wrist 65 lies in line with the open end 76 of the angular slot 66 in the operating lever 53. Upon turning the main drive shaft, the coupling 56, 59 is rendered effective and the transmission lever 57 is rocked to operate the link 63, the wrist 65 of which works idly in the open end 76 of the angular slot without rocking the operating lever. Upon the retirement of the connecting bar 43 to normal position, which occurs when the total key 39 is restored, either at the end of the forward stroke and the commencement of the return stroke, (as when taking a total and clearing the machine), or at the end of the return stroke, (as when taking a sub-total), the catch 75 frees the link 63 to the action of a restoring spring 77 which shifts the link and with it the wrist 65 back to effective connection with the operating lever 53. Turning a knob 78 on shaft 52 resets the numeral wheels 51 of the indicator to zero.

From the foregoing it will be seen that I have provided a mechanically or automatically operated adjusting mechanism driven only during a printing or accumulating operation of the machine, that is, an effective stroke, and one which does not impose any increase in the touch of the keyboard.

Changes may be made in the form and arrangement of the several parts set forth without departing from the spirit and scope of the invention.

I claim—

1. In a calculating machine, the combination with registering and printing mechanisms, means to connect said mechanisms, a drive mechanism therefor, and an item indicator, of actuating devices for said indicator set for effective operation by said connecting means, and means to drive said actuating devices.

2. In a calculating machine, the combination with a series of counters, a series of type carriers bearing types, means to drive said counters and position said types, and an item indicator, of actuating devices for said indicator set for effective operation by said driving and positioning means, and means to operate said actuating devices.

3. In a calculating machine, the combination with a series of counters, means with which said counters are connected, to drive said counters, and detaining members to hold the drive means inoperative on an idle stroke of the machine, of an item indicator and actuating means therefor adapted to be set and operated by said driving means.

4. In a calculating machine, the combination with registering mechanism, and drive means therefor, of an item indicating mechanism including an indicator, normally disabled draft mechanism to operate the indicator, and setting devices controlled by the drive means to render the draft mechanism effective.

5. In a calculating machine, the combination with registering and printing mechanisms, and means to connect the same for contemporaneous operation, of an item indicator, normally-disabled draft mechanism therefor, a part of which operates at each stroke of the machine, and devices controlled by said connecting means to adjust the draft mechanism for effective operation.

6. In a calculating machine, the combination with registering mechanism, and drive members therefor, of an item indicator, draft mechanism therefor including a normally-disabled coupling; a universal bar operated by any of the drive members, and an adjuster controlled by said universal bar to set the coupling for operation.

7. In a calculating machine, the combination with a main drive shaft; drive members; and an item indicator; of normally disabled draft mechanism for the indicator; and a part operable coincidently with any of the drive members to adjust the draft mechanism for effective operation.

8. In a calculating machine, including a main drive shaft, the combination with an item indicator; of normally disabled draft mechanism therefor; and adjusting mechanism operable from the main drive shaft only during an accumulating operation of the machine to set the draft mechanism to operate the indicator.

9. In a calculating machine, the combination with a main drive shaft; and drive members; of an item indicator; normally disabled draft mechanism therefor; and adjusting mechanism operable by the drive members during an effective stroke of the main drive shaft, to set the draft mechanism for effective operation.

10. In a calculating machine, the combination with a main drive shaft; drive members; means to advance said members; of an item indicator; normally disabled draft mechanism therefor, driven from the main shaft; and adjusting mechanism shifted by the drive members to set the draft mechanism for effective operation.

11. In a calculating machine, the combination with several drive members; and counters driven thereby; of an item indicator; normally disabled draft mechanism therefor; and adjusting mechanism, including a universal rod operable by any of the drive members, to set the draft mechanism for effective action.

12. In a calculating machine, the combination with a main drive shaft; of an item indicator; draft mechanism therefor, including a normally disabled coupling, one of the members of which is driven from the main shaft; and adjusting mechanism normally operable during each effective stroke of the shaft to set the coupling for active operation.

13. In a calculator, the combination with a counter, a drive member therefor, and a main drive shaft, of an item indicator, draft mechanism therefor, including a draft member operable at each stroke of the drive shaft, a transmission lever connected with the indicator, coupling members carried by the lever and draft member, respectively, and normally displaced relatively to each other; and automatically operable adjusting mechanism to shift the displaced coupling to operative position.

14. In a calculating machine, the combination with a gang of counters; and separate drive means for the respective counters, of an item-indicator; draft mechanism therefor, including a normally-disabled coupling;

and adjusting mechanism for said coupling, comprising a universal bar operated by any of said drive means, and a tappet shifted by said bar to set the coupling for operation.

15. In a calculating machine, the combination with a gang of counters, drive members for the respective counters, a keyboard mechanism to control the operation of the drive members, and a main drive shaft, of an item-indicator; draft mechanism for said indicator, actuated from the main drive shaft, and comprising an operating lever connected with the indicator, and a normally-disabled coupling, one member of which is shiftable relatively to the other; a universal bar operated by any of said drive members, and a tappet controlled by said universal bar to set the shiftable coupling member to position to be engaged by the remaining coupling member during the operation of the main drive shaft.

16. In a calculator, the combination with a counter, a drive member therefor, and a main drive shaft, of an item indicator, draft mechanism therefor, including a draft member operable at each stroke of the drive shaft, a transmission lever connected with the indicator, coupling members carried by the lever and draft member, respectively, and normally displaced relatively to each other; a universal bar operated by the drive member, and an adjuster controlled by said bar to shift one of said couplings into operative position relatively to the remaining coupling.

17. In a calculating machine, the combination with a main drive shaft; drive members; and an item indicator; of normally disabled draft mechanism for the indicator; a part operable coincidently with any of the drive members to adjust the draft mechanism for effective operation; and means to prevent the operation of the indicator by the draft mechanism when in adjusted position.

18. In a calculating machine, the combination with a main drive shaft; and special key mechanism; of an item indicator; means to automatically effect the operation of the indicator on effective strokes of the main drive shaft; and means controlled by the special key to prevent the operation of the indicator.

19. In a calculating machine, the combination with a main drive shaft; and special key mechanism; of an item indicator; normally disabled draft mechanism for the indicator and operated by the main drive shaft; adjusting mechanism automatically operated on effective strokes of the main drive shaft to reënable the draft mechanism; and means controlled by the special key to render ineffective the operation of the draft mechanism.

20. In a calculating machine, the combination with registering machanism, a main drive shaft, and clearing mechanism, of an item indicator, mechanism to operate the indicator on every effective stroke of the main drive shaft, and means controlled by the clearing mechanism to disable the indicator-operating mechanism during a clearing stroke.

21. In a calculating machine, the combination with registering mechanism, clearing mechanism therefor, and a main drive shaft, of an item indicator having an operating lever; normally-disabled draft mechanism connected with the operating lever and actuated from the main drive shaft, adjusting mechanism operable upon each effective stroke of the machine to render the draft mechanism effective, and means controlled by the clearing mechanism to disable the draft mechanism.

22. In a calculating machine, the combination with a gang of counters, drive members for the respective counters, clearing mechanism, and a main drive shaft, of an item indicator having an operating lever; normally-disabled draft mechanism releasably connected with the operating lever, an adjusting mechanism operated by any of the drive members to set the draft mechanism for effective operation, and means operated by the clearing mechanism to disconnect the draft mechanism and the operating lever.

23. In a calculating machine, the combination with registering mechanism, clearing mechanism therefor, and a main drive shaft, of an item indicator having an operating lever; draft mechanism including a transmission lever, a normally-disabled coupling to connect the transmission lever with the main drive shaft, an adjusting mechanism controlled by the registering mechanism to render the coupling effective, a shiftable link to connect the transmission lever and the operating lever, a catch controlled by the clearing mechanism, to disengage the link and operating lever, and means to restore the connection between the link and operating lever.

24. In a calculating machine, the combination with registering mechanism, clearing mechanism therefor, and a main drive shaft, of an item indicator having an operating lever; normally-disabled draft mechanism, including a transmission lever, and a shiftable link, the latter releasably connected to the operating lever; means to render the draft mechanism operative on each effective stroke of the drive shaft, and a shifter controlled by the clearing mechanism to disconnect the link and operating lever.

25. In a calculator, the combination with registering mechanism, including drive members, a main drive shaft, and total mechanism, of an item indicator, including an operating lever having an angular slot; draft mechanism for said indicator, operable at every effective stroke of the main drive shaft, and including a link, having a wrist normally fitted in one arm of the angular slot, to rock the lever, a catch controlled by the total mechanism to shift the wrist into line with the remaining arm of the angular slot when a totaling operation is to take place, and a spring to restore the wrist to normal position upon the completion of the totaling operation.

26. In a calculating machine, an item indicator operable at each effective stroke of the machine whereby, when keys have been depressed to displace the usual detents lying in the paths of the several counter-driving members, the latter are permitted to advance and thereby operate a universal bar having a finger which shifts a hook into the path of a second hook operated from the main drive shaft, the engagement of the hooks operating to swing a lever having a link pivoted thereto and carrying a stud entered in an angular slot in a crank arm on the operating lever of the indicator, the depression of the clearing mechanism operating a catch to swing the link to shift its stud from one arm of the slot to the other whereby the stud travels idly without rocking the operating lever.

27. In a calculating machine, the combination with a main drive shaft; and an item indicator; of draft mechanism for the indicator, said mechanism including a pair of coöperating couplings driven from the main drive shaft, one of which couplings is normally displaced relatively to the remaining coupling; adjusting mechanism to set the displaced coupling in operative position, the remaining coupling adapted to displace the adjusted coupling after the indicator has been operated.

28. In a calculating machine, the combination with a main drive shaft; and an item indicator; of draft mechanism for the indicator; said mechanism including a pair of coöperating couplings driven from the main drive shaft, one of which couplings is normally displaced relatively to the remaining coupling; adjusting mechanism to set the displaced coupling in operative position; means to releasably retain the displaced coupling in adjusted position, the remaining coupling adapted to displace the adjusted coupling after the indicator has been operated.

29. In a calculating machine, the combination with drive members, a main drive shaft; and an item indicator, of draft mechanism for said indicator, operated from the main drive shaft, and including a shiftable coupling member, an adjusting mechanism operable by any of the drive members to set the shiftable coupling in operative position, means to hold the coupling effective subsequently to the operation of the adjusting means, and a second coupling with which said shiftable coupling coöperates, and which restores said shiftable coupling to ineffective position.

30. In a calculator, the combination with an item indicator, of draft mechanism therefor, including a pair of coupling members, one of which is shiftable relatively to the other and normally lies in ineffective position, an adjusting mechanism to set the shiftable coupling to effective position to be engaged by the remaining coupling, and an incline on the shiftable coupling wiped by the remaining coupling to restore the shiftable coupling to ineffective position.

HENRY KÜNTZLER.

In presence of—
 OSCAR JAUSSON,
 ROBERT F. WILNER.